(12) United States Patent
Miller et al.

(10) Patent No.: US 8,453,967 B2
(45) Date of Patent: Jun. 4, 2013

(54) MOBILE AIRCRAFT RECOVERY SYSTEM

(75) Inventors: Stephen W. Miller, Cockeysville, MD (US); Steven J. Fox, Parkton, MD (US); Graham W. Schill, Baltimore, MD (US); Brian A. Aske, Parkton, MD (US)

(73) Assignee: AAI Corporation, Hunt Valley, MD (US)

( * ) Notice: Subject to any disclaimer, the term of this patent is extended or adjusted under 35 U.S.C. 154(b) by 274 days.

(21) Appl. No.: 12/796,950

(22) Filed: Jun. 9, 2010

(65) Prior Publication Data

US 2011/0303789 A1    Dec. 15, 2011

(51) Int. Cl.
*B64F 1/02* (2006.01)

(52) U.S. Cl.
USPC ............... 244/110 C; 244/110 R; 244/110 F

(58) Field of Classification Search
USPC ............................ 244/110 F, 110 C, 110 R
See application file for complete search history.

(56) References Cited

U.S. PATENT DOCUMENTS

| | | | |
|---|---|---|---|
| 2,720,048 A | 10/1955 | Bracey et al. | |
| 2,913,197 A * | 11/1959 | Fonden et al. | 244/110 R |
| 3,367,608 A * | 2/1968 | Charno et al. | 244/110 R |
| 4,056,247 A * | 11/1977 | Bernard et al. | 244/110 C |
| 4,147,317 A | 4/1979 | Mayhew et al. | |
| 4,456,205 A | 6/1984 | Alavoine et al. | |
| 4,753,400 A | 6/1988 | Reuter et al. | |
| 4,809,933 A | 3/1989 | Buzby et al. | |
| 4,979,701 A * | 12/1990 | Colarik et al. | 244/110 C |
| 7,090,166 B2 | 8/2006 | Dennis et al. | |
| 7,104,495 B2 | 9/2006 | McGeer | |
| 7,114,680 B2 | 10/2006 | Dennis | |
| 7,143,976 B2 | 12/2006 | Snediker et al. | |
| 7,578,467 B2 * | 8/2009 | Goodrich | 244/110 C |
| 2005/0151009 A1 | 7/2005 | Roeseler et al. | |
| 2005/0178894 A1 | 8/2005 | McGeer et al. | |
| 2006/0140718 A1 | 6/2006 | Lamore | |
| 2009/0224097 A1 * | 9/2009 | Kariv | 244/63 |
| 2010/0019085 A1 | 1/2010 | Turrillas Las Heras | |

OTHER PUBLICATIONS

Teledyne Ryan Aeronautical, "Mini-RPV Recovery System Conceptual Study" Aug. 1977.*

(Continued)

*Primary Examiner* — Timothy D Collins
*Assistant Examiner* — Jamie S Stehle
(74) *Attorney, Agent, or Firm* — Venable LLP; Jeffri A. Kaminski; Tamatane J. Aga

(57) ABSTRACT

An apparatus for the recovery of an aircraft includes a capture device and first and second pole pairs. The first pole pair includes first top and bottom poles respectively placed near first top and bottom portions of the capture device. The first pole pair is configured to move from a first position, in which the pole pair holds the capture device in an open position to capture the aircraft, to a second position, in which the pole pair holds the capture device in a closed position to contain the captured aircraft after impact of the aircraft on the capture device. The second pole pair includes second top and bottom poles respectively placed near second top and bottom portions of the capture device. The second pole pair is also configured to move from the first position to the second position. Further, energy elements are coupled on one end to a respective top or bottom portion of the capture device and on another end to a respective top or bottom pole. The energy elements are disposed to absorb the force of the impact of the aircraft.

13 Claims, 11 Drawing Sheets

OTHER PUBLICATIONS

International Search Report (PCT/ISA/210) issued in Application No. PCT/US2011/34962, Jul. 31, 2011.
Written Opinion of the International Searching Authority (PCT/ISA/237) issued in Application No. PCT/US2011/34962, Jul. 31, 2011.

* cited by examiner

MOBILE AIRCRAFT RECOVERY SYSTEM

BACKGROUND

Embodiments of the present invention relate generally to new and useful improvements in mobile aircraft recovery, and more particularly to an apparatus and method for the capture of aircraft, including unmanned aerial vehicles (UAVs), drones, and other flight devices or projectiles.

The recovery of aircraft without the use of a runway is generally known in the art. See, for example, the "skyhook" approach, as disclosed in U.S. Pat. Nos. 7,090,166, 7,104, 495, 7,114,680 and Pre-Grant Publication Nos. 2005/0151009 and 2005/0178894, where a boom from a ship or other vehicle is extendable to deploy a recovery line to capture the aircraft in flight. The skyhook approach requires that the leading edge of the aircraft wing be strong enough to survive the wire impact on the recovery line. Thus, the aircraft structure is heavy, resulting in a negative impact on aircraft payload capacity and endurance. Other approaches, such as the arresting hook in U.S. Pat. No. 7,143,976 to Snediker et al., or the deployable lifting device in U.S. Pat. No. 4,753,400 to Reuter et al., share similar problems.

In short, there exists a need in the art for a mobile aircraft recovery system that is able to limit damage to the aircraft during recovery using a lighter aircraft and, thus, minimizing, the impact on aircraft endurance. A further need exists for a mobile aircraft recovery system that is itself small and lightweight so as to be mobile, versatile on land and sea, and transportable. Additionally, a need exists for a mobile aircraft recovery system having a strong wind tolerance, including tolerance of wind variation, direction and speed.

SUMMARY

In an embodiment, an apparatus for the recovery of an aircraft includes a capture device and a first and second pole pair. The first pole pair includes first top and bottom poles respectively placed near first top and bottom portions of the capture device. The first pole pair is configured to move from a first position, in which the pole pair holds the capture device in an open position to capture the aircraft, to a second position, in which the pole pair holds the capture device in a closed position to contain the captured aircraft after impact of the aircraft on the capture device. The second pole pair includes second top and bottom poles respectively placed near second top and bottom portions of the capture device. The second pole pair is also configured to move from the first position to the second position. The apparatus further includes energy elements each coupled on one end to a respective top or bottom portion of the capture device and on another end to a respective top or bottom pole. The energy elements are disposed to absorb the force of the impact.

According to one exemplary embodiment, the first pole pair comprising first top and bottom poles may be coupled at first ends to a first support beam, the top and bottom poles extending to first top and bottom portions of the capture device. Similarly, the second pole pair comprising second top and bottom poles may be coupled at first ends to a second support beam, the top and bottom poles extending to second top and bottom portions of the capture device. Further, a pivot beam may be coupled to each of the first and second support beams, wherein the pivot beam is disposed to pivot each of the first and second support beams forward in the direction of the impact of the aircraft.

In another embodiment, a method for the recovery of an aircraft includes coupling a first pole pair comprising first top and bottom poles respectively to first top and bottom positions of a capture device and coupling a second pole pair comprising second top and bottom poles respectively to second top and bottom positions of the capture device. The method further includes moving each pole pair from a first position, in which the pole pairs hold the capture device in an open position to capture the aircraft, to a second position, in which the pole pairs hold the capture device in a closed position to contain the captured aircraft. The method includes absorbing he force of the impact using energy elements, each coupled on one end to a respective top or bottom position of the capture device and on another end to a respective top or bottom pole.

According to a further embodiment, the method includes pivoting the first and second pole pairs forward in the direction of the impact.

This summary is provided merely to introduce certain concepts and not to identify any key or essential features of the claimed subject matter. Further features and advantages of embodiments of the invention, as well as the structure and operation of various embodiments of the invention, are described in detail below with reference to the accompanying drawings.

BRIEF DESCRIPTION OF THE DRAWINGS

The foregoing and other features and advantages of embodiments of the invention will be apparent from the following, more particular description of embodiments of the invention, as illustrated in the accompanying drawings wherein like reference numbers generally indicate identical, functionally similar, and/or structurally similar elements. Unless otherwise indicated, the accompanying drawing figures are not to scale.

DETAILED DESCRIPTION

Various embodiments of the invention are discussed herein. While specific embodiments are discussed, specific terminology is employed for the sake of clarity. However, the invention is not intended to be limited to the specific terminology so selected and it should be understood that this is done for illustration purposes only. A person skilled in the relevant art will recognize that other components and configurations can be used without parting from the spirit and scope of the invention. Each specific element includes all technical equivalents that operate in a similar manner to accomplish a similar purpose.

Figure 1:
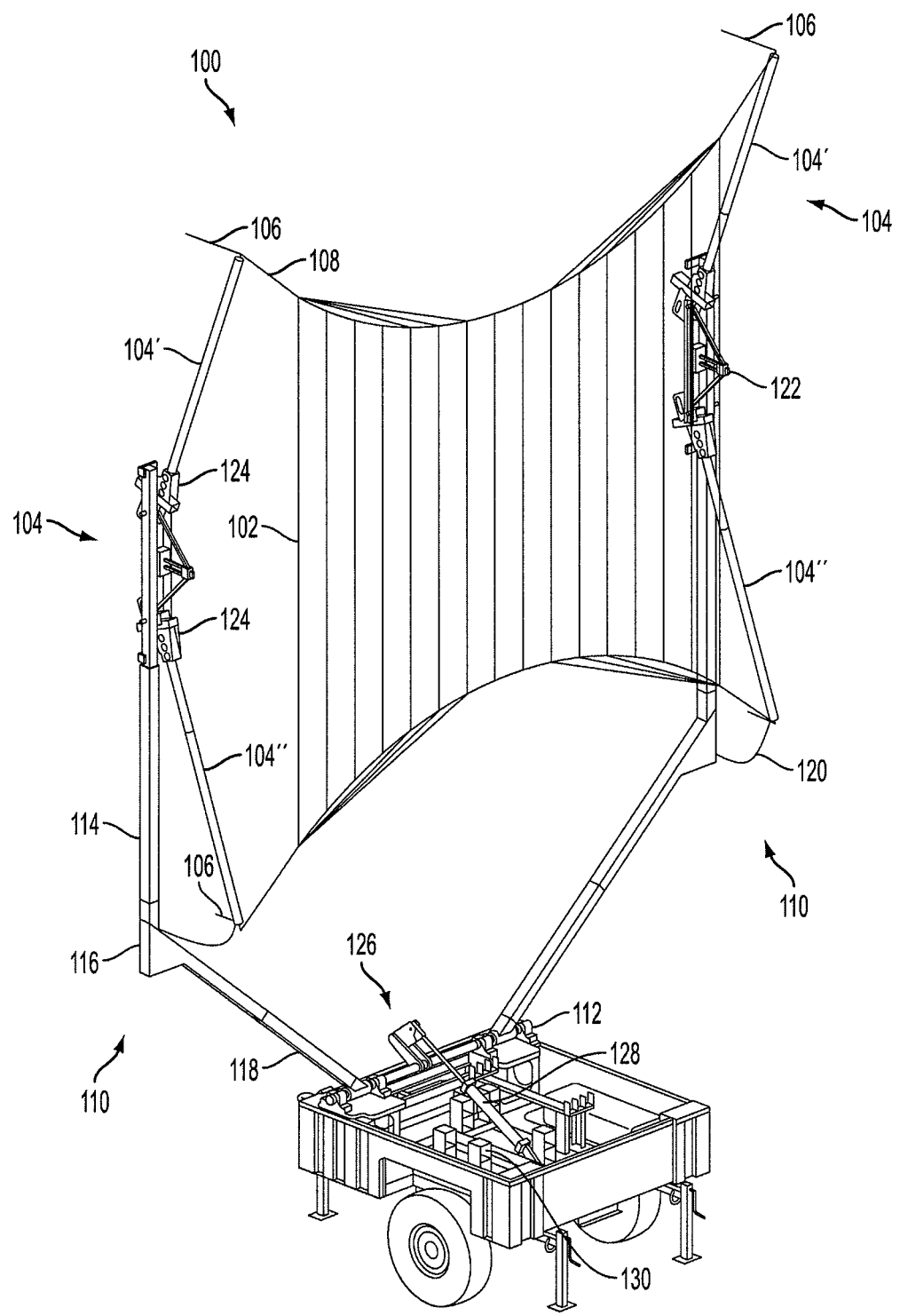
FIG. 1 depicts a perspective view of the mobile aircraft recovery system according to an embodiment of the present invention.

Referring now to the drawings, there is shown in FIG. 1 a perspective view of the mobile aircraft recovery system 100 according to an embodiment of the present invention. A capture device 102, for example, a net, sits in an open vertical position above the ground prior to the capture of an aircraft. The vertical position of the net 102 may be referred to as a "ready to capture position." The net 102 is shaped to focus the deceleration loads on the aircraft wing closest to the fuselage, thus avoiding wing tip bending. For example, according to one embodiment, the net 102 may be a ribbon net or other net which forms a basket shape, expanding outward to cradle the aircraft during capture. The use of a basket-shaped net retains the aircraft after impact and prevents the aircraft from falling out of the net or springing backwards off the net 102 and incurring damage.

The net 102 is supported, for example, by two pole pairs 104. The pole pairs 104 of the mobile aircraft recovery system 100 are used to absorb the momentum of the aircraft during capture. Each pole pair 104 may include an upper net pole 104' coupled to an upper portion of the net 102 and a lower net pole 104" coupled to a bottom portion of the net 102. In the embodiment shown, the poles 104', 104" are coupled to corners of the net 102. Each net pole 104', 104" may rotate about a pivot point located at an opposite end of the respective net pole 104', 104" from the net 102. Further, the upper and lower net poles 104', 104" of each pole pair 104 may move in synchronization relative to one another.

The initial impact of the aircraft on the net 102 engages the pivoting movement of the pole pairs 104. A timing or kinematic mechanism may be coupled to each pole pair 104 to help synchronize the movement of the top and bottom net poles 104', 104" together. Such synchronization allows the net 102 and pole pairs 104 capture an aircraft 300 (see FIG. 3A) by folding around the primary aircraft wing to decelerate the aircraft while engulfing the aircraft for post deceleration retention.

Figure 2A:
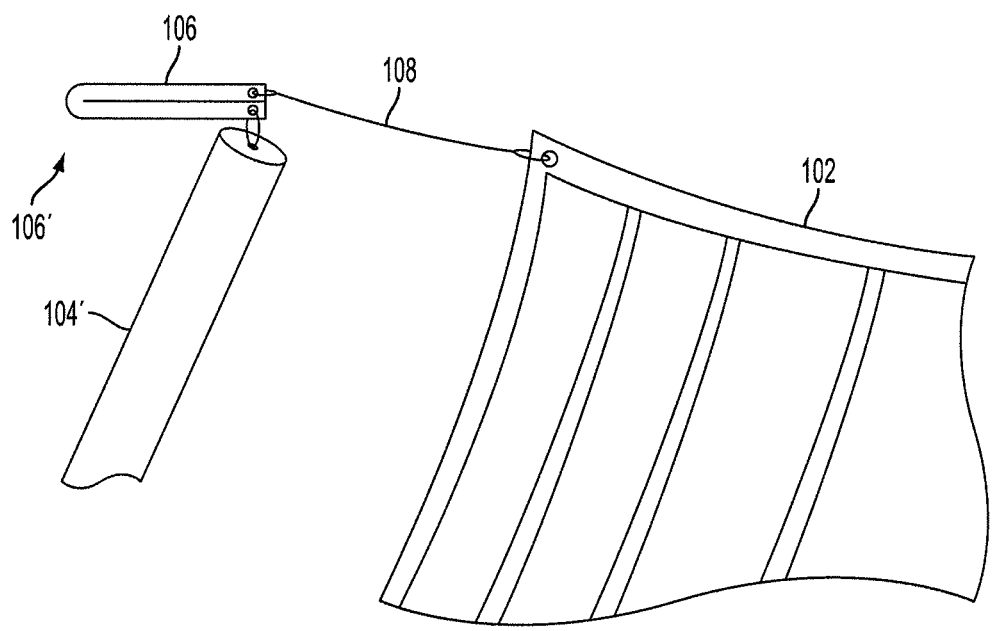
FIGS. 2A and 2B depict a detailed view of the tear straps of the mobile aircraft recovery system as shown in FIG. 1.

According to one embodiment, the net 102 and pole pairs 104 may be coupled using energy elements 106, i.e. tear straps. The tear straps 106 may be positioned on the corners, or other positions, of the net 102 to improve capture geometry and to reduce the initial structural shock impulse, i.e. to attenuate the initial peal load. As seen in FIG. 2A, the tear straps 106 may be positioned between ropes or lanyards 108 holding the corners of the net 102 and the ends of each net pole 104', 104". Prior to capture, the tear straps 106 are embodied in a retracted position 106' and, for example, may comprise Nylon, or other material, doubled-over straps sewn together down the center of the strap with a thin sewing thread. In the retracted position 106', the tear straps 106 may provide additional slack to the net 102 to attenuate the impact force as the aircraft wings initially hit the net 102.

Figure 2B:
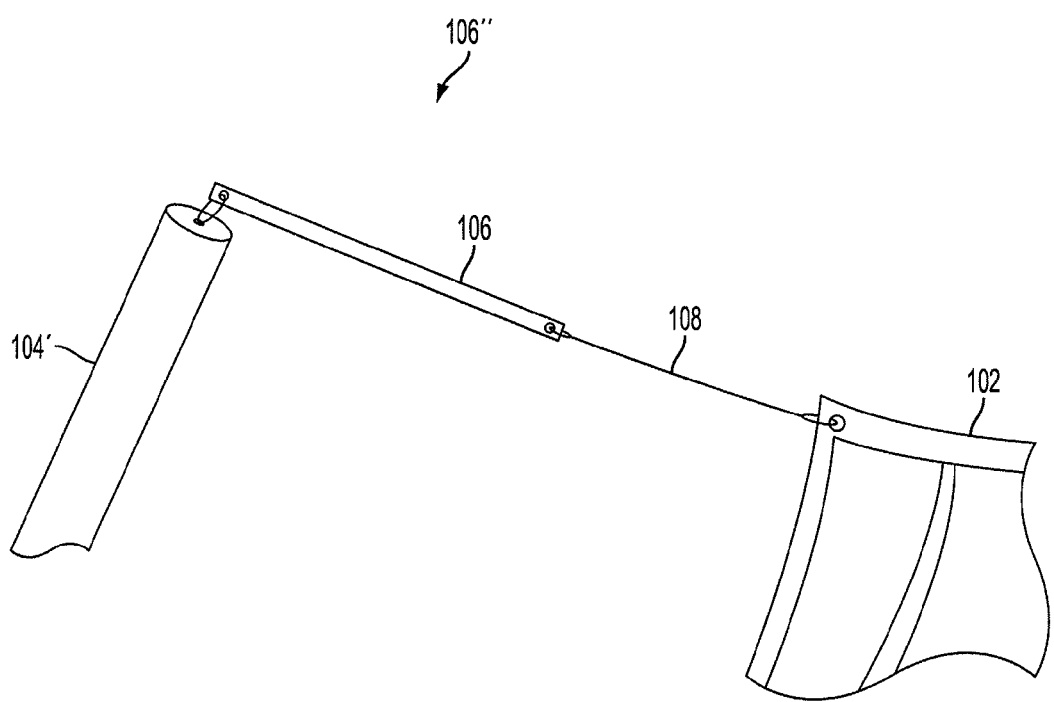

Following the impact of the aircraft 300 on the net 102, the tear straps 106 may shift from the retracted position 106' into a released position 106", as shown in FIG. 2B. This may occur, for example, when the sewing thread of the tear strap 106 registers a certain force, for example, a force of approximately 50 lbs, that is associated with the impact of the aircraft on the net 102, and breaks; ripping the seam holding the tear strap 106 in the retracted position 106'. Thus, the breaking of the sewing thread allows the force of the impact to pull the tear strap 106 in retracted position 106' fully or partially straight into the released position 106", as seen in FIG. 2B. This causes the tear straps 106 to change the angle of the net to improve capture of the aircraft. As the straps tear they smoothly accelerate the pivot arms thus avoiding a rapid acceleration similar to an impact that would occur without these devices. Alternatively, other energy elements may be used, such as, for example, slip devices, Velcro® or shock absorbers. After use, the energy elements may either be reused or replaced.

According to the embodiment shown in FIG. 1, the pole pairs 104 are held in place by two hydraulically erectable arm assemblies 110 joined to a central shaft, called the recovery pivot beam 112. Each arm assembly 110 includes a vertical beam 114, a corner beam 116 and a diagonal beam 118. On one end of the arm assembly 110, the vertical beam 114 is coupled to the pole pair 104. On the other end of the arm assembly 110, the diagonal beam 118 is connected to the recovery pivot beam 112. The corner beam 116 serves to connect the vertical beam 114 to the diagonal beam 118.

According to one embodiment, the mobile aircraft recovery system 100 may include one or more shear devices 120, such as a shear pins, nylon ties, or the like, which hold the net in the ready to capture position prior to recovery. Specifically, the shear devices 120 maintain an open net 102 by holding the lower net pole 104" in a certain position relative to the arm assembly 110. This prevents the pole pairs 104 from prematurely pivoting, for example, due to wind or other external forces. When a certain force that is associated with the impact of the aircraft on the net 102 is registered by the shear device 120, the shear devices 120 release allowing the pole pairs 104 to gain their initial momentum forward. The shear devices 120 may be replaced after each recovery.

According to another embodiment, the mobile aircraft recovery system 100 may include one or more shock absorption devices 122 positioned to absorb energy upon impact of the aircraft 300. As shown in FIG. 1, the shock absorption devices 122 may be coupled to the top of vertical beam 114. The shock absorption devices 122 may also be coupled to the pole pairs 104 and may provide the pivot point for each pole pair 104. The shock absorption devices 122 may be, for example, friction dampers or brakes, rotary shock absorbers or dampers, or linear dampers. Such shock absorption devices 122 may help slow the aircraft and bring the aircraft to rest in the net. The pivot of the whole structure of the mobile aircraft recovery system 100 helps keep the aircraft from swinging.

Figure 1A:
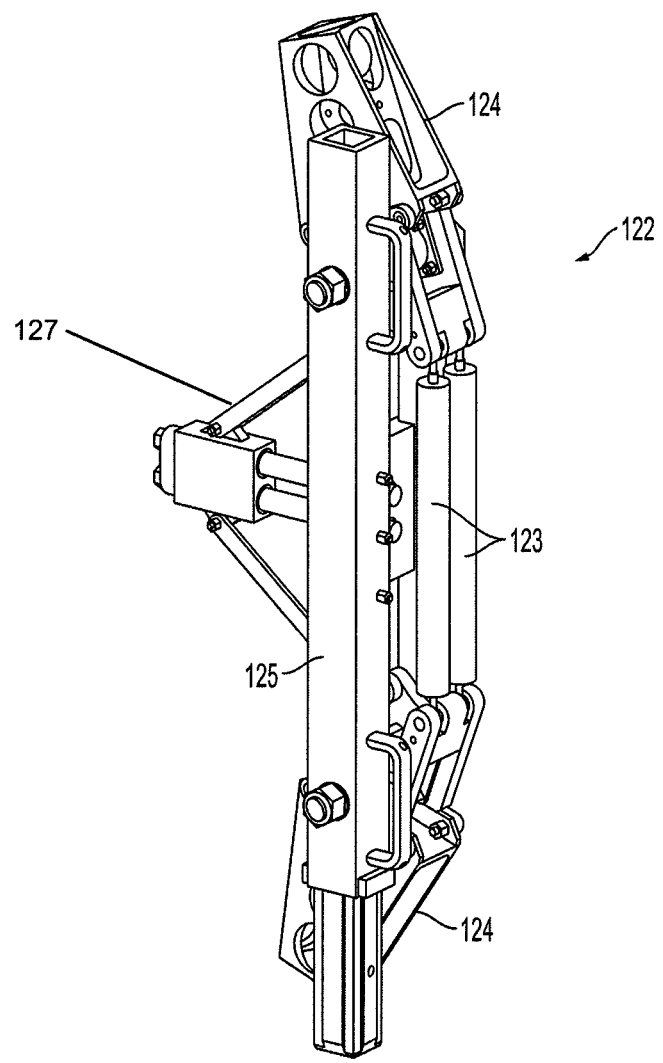
FIG. 1A depicts a rear detailed view of the shock absorption device of the mobile aircraft recovery system, as shown in FIG. 1

FIG. 1A depicts a rear detailed view of a shock absorption device 122, as shown in FIG. 1. According to one embodiment, the shock absorption device 122 includes a vertical bar 125 which may be coupled to the vertical beam 114 of the arm assembly 110. A sliding mechanism 127 may be coupled to the vertical bar 125 to control the pivoting movement of the pole pair 104. Coupled to the sliding mechanism 127 are two dampers 123 to absorb the shock of the impact of the aircraft in the net 102. As described above, the dampers 123 may be friction, rotary or linear dampers. Pole levers 124 may be further coupled to each end of the sliding mechanism 127 and are able to attach to the ends of the top and bottom net poles 104', 104".

According to a further embodiment, each shock absorption device 122 may include the timing or kinematic mechanism which, as previously discussed, facilitates the synchronous movement of the top and bottom net poles 104', 104". The timing mechanism enables the pole levers 124 of the top and bottom net poles 104', 104" to move at the same time. The synchronous movement of the pole pairs 104, when combined with the energy elements 106, forms the net 102 into a basket configuration which cradles the aircraft upon impact. Non-synchronous movement of the pole pairs 104 may cause the net 102 to remain in the flat ready to capture position, causing the aircraft to fall or bounce out of the net 102.

According to a further embodiment, the mobile aircraft recovery system 100 includes a hydraulic activation system 126, including the recovery pivot beam 112, a recovery actuator 128 and a recovery base 130, for raising and lowering the arm assemblies 110 and net 102. The hydraulic activation system 126 may also include a hydraulic cushion (not shown). For example, the hydraulic cushion may include hydraulic valves and gas accumulators that are separate from the raising and lowering actuation function that permits the actuator to move passively in the direction of recovery. The motion is permitted because the valves cause oil holding the actuator in the upright position to flow into the gas accumulator.

According to one embodiment, the recovery pivot beam 112 of the hydraulic activation system 126 allows the diagonal beams 118 of the arm assemblies 110 to fall or pivot forward during the capture of the aircraft to further help dissipate the momentum of the aircraft. This is shown in FIG. 4, which depicts a side view of the mobile aircraft recovery system during impact of the aircraft. Angle $\alpha$ shows the change in position of the diagonal beam 118 forward from a starting position along axis A (see FIG. 3A), that is perpendicular to the ground.

Figure 3A:
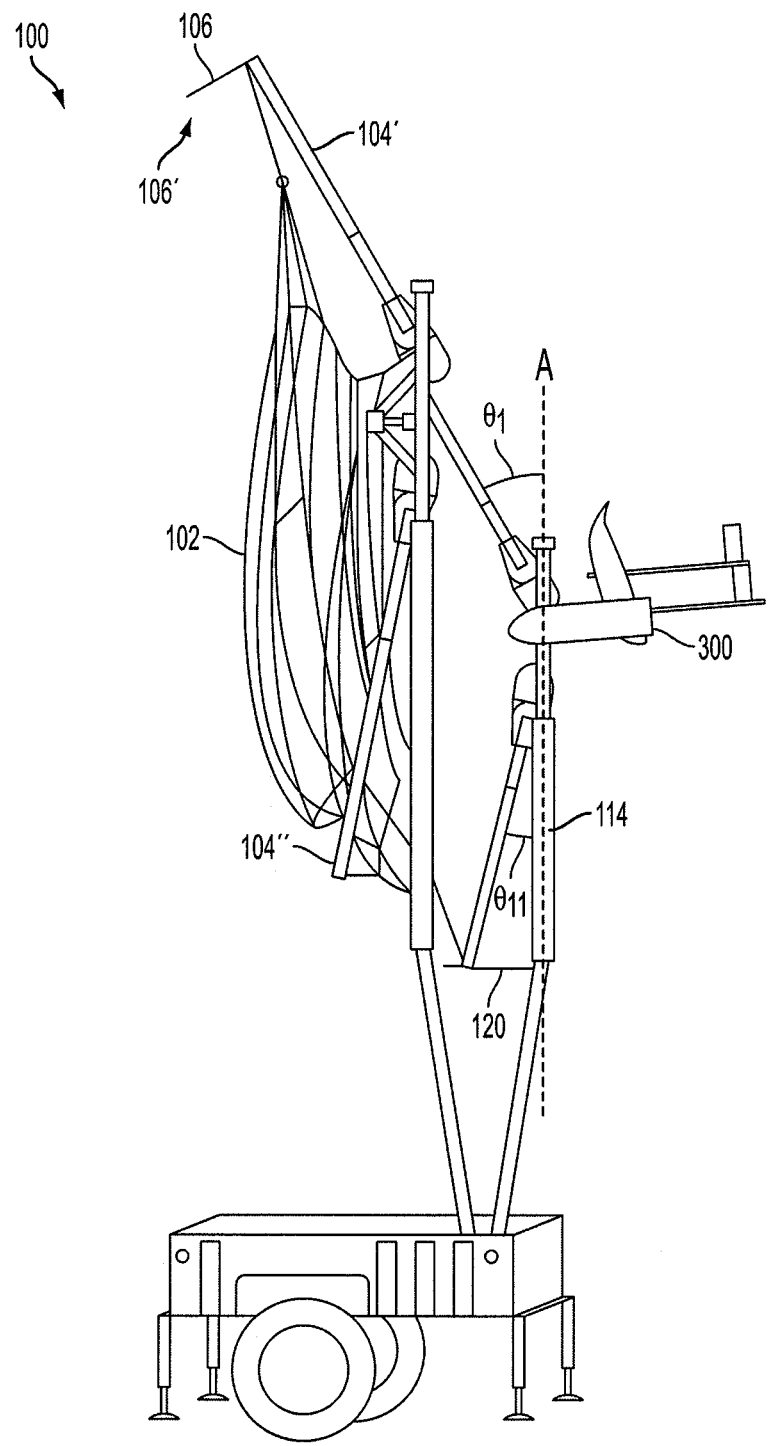
FIG. 3A depicts a side view of the mobile aircraft recovery system prior to impact of the aircraft, according to an embodiment of the present invention.
Figure 4:
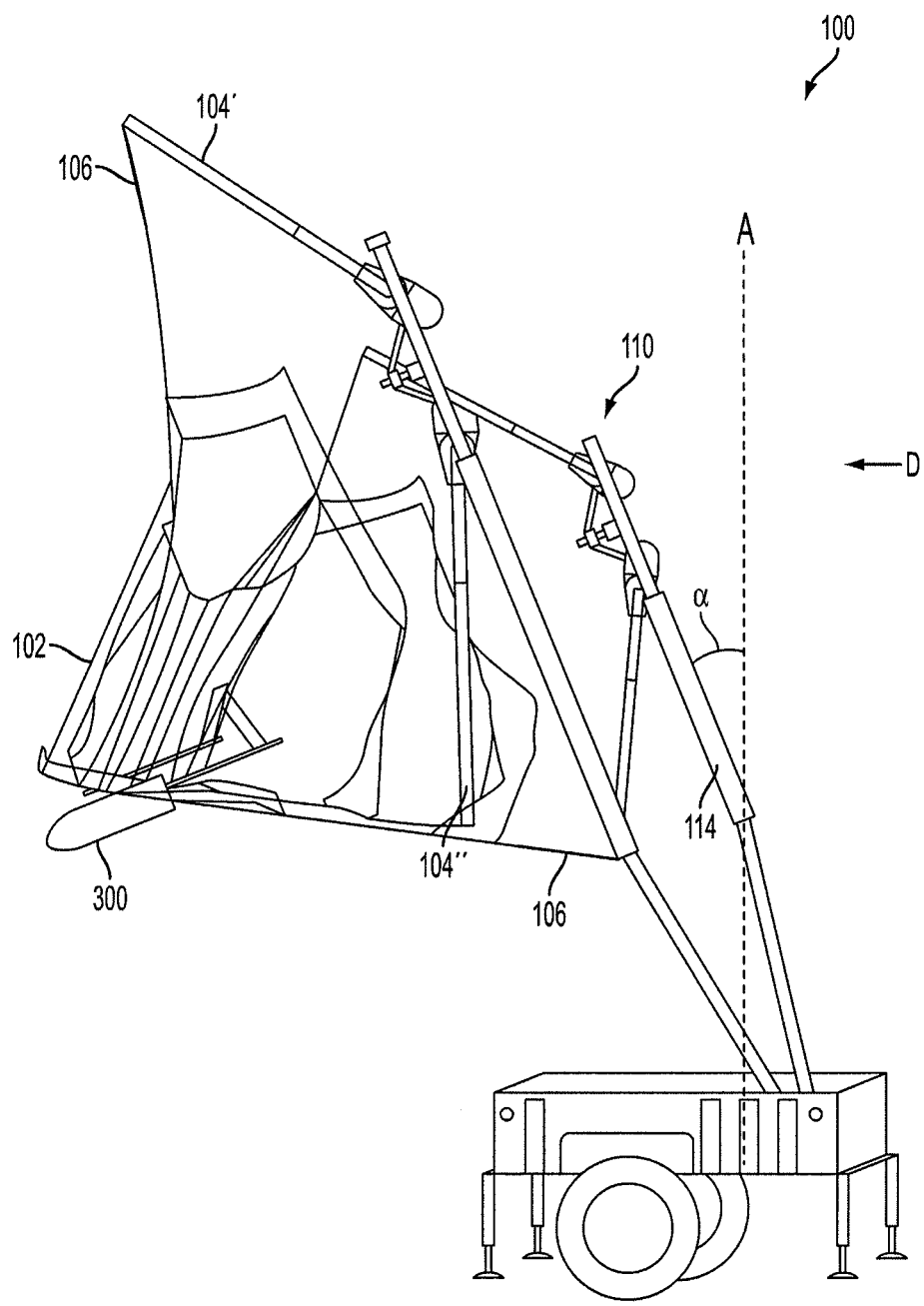
FIG. 4 depicts a side view of the mobile aircraft recovery system during impact of the aircraft, according to an alternative embodiment of the present invention

FIG. 3A depicts a side view of the mobile aircraft recovery system 100 prior to impact of the aircraft 300, according to an embodiment of the present invention. The vertical beam 114 of the arm assembly 110 is positioned along a perpendicular axis A relative to the ground. Prior to impact of the aircraft 300, the top net poles 104' are positioned at a pre-determined angle $\theta_1$ relative to axis A and the bottom net poles 104" are positioned at a predetermined angle $\theta_{11}$ relative to axis A. The predetermined angles $\theta_1$ and $\theta_{11}$ of the net poles 104', 104" are selected to ensure that the net 102 remains in the ready to capture position prior to impact. According to one embodiment, angle $\theta_1$ is approximately equal to angle $\theta_{11}$. According to another embodiment, angles $\theta_1$ and $\theta_{11}$ of the net poles 104', 104" are both less than 45 degrees. Further, the tear strips 106 remain in their initial retracted position 106', which aids in pulling the net 102 close to each of the top and bottom net poles 104', 104" and in ready to capture position.

As discussed above, shear devices 120 may be used maintain the angles $\theta_{11}$ between the bottom net poles 104" and the vertical beam 114 prior to impact. Because each bottom net pole 104" moves in synchronization with its respective top net pole 104', maintaining the angle $\theta_{11}$ of the bottom net pole 104" using a shear device 120 simultaneously maintains the angle $\theta_1$ of the top net pole 104'. The shear devices 120 prevent wind or any other external force from inadvertently interfering with the recovery of the aircraft 300.

Figure 3B:
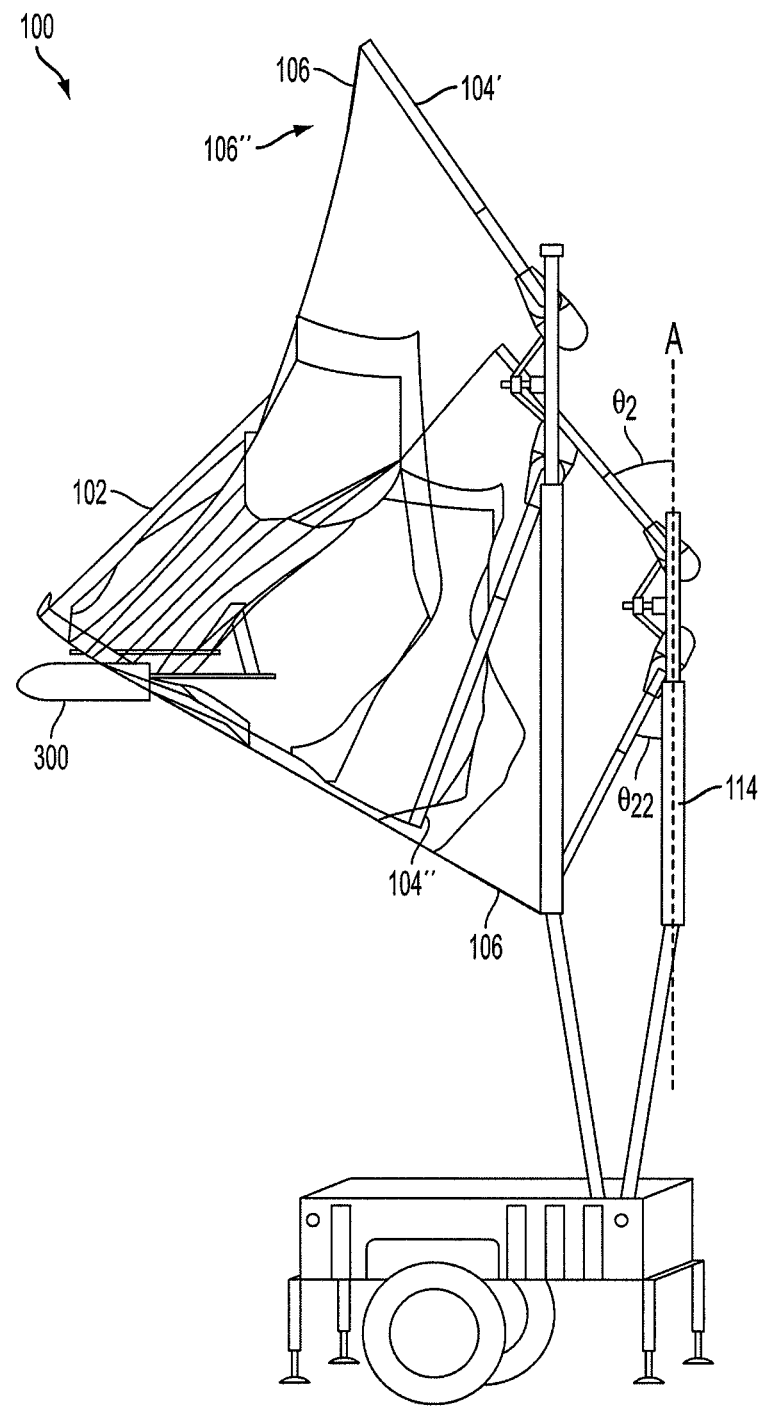
FIG. 3B depicts a side view of the mobile aircraft recovery system during impact of the aircraft, according to an embodiment of the present invention.

FIG. 3B depicts a side view of the mobile aircraft recovery system 100 during impact of the aircraft 300, according to an embodiment of the present invention. As the aircraft 300 strikes the net 102, the force of impact releases the shear device 120 and causes the pole pairs 104 to each pivot about their pivot points forward in the direction of impact D. The pivoting momentum of the pole pairs 104, allows the net 102 to form a basket-like configuration to envelop and capture the aircraft 300. The energy absorbing devices 122, i.e. the dampers, attached to the pole pairs 104 help bring the aircraft 300 to rest in the net 102.

As the pole pairs 104 pivot forward the angles $\theta_1$ and $\theta_{11}$ of the top and bottom net poles 104', 104", respectively, increase to angles $\theta_2$ and $\theta_{22}$ relative to the perpendicular axis A defined by the vertical beam 114 of the arm assembly 110. According to one embodiment, the angle $\theta_2$ of the top net pole 104' increases more than the angle $\theta_{22}$ of the bottom net pole 104" during capture.

Furthermore, the impact of the aircraft 300 on the net 102, as well as the pivoting motion of the pole pairs 104, causes the tear straps 106 to pull from the retracted position 106' into the released position 106". The release of the tear straps 106, i.e. the straightening out of the retracted position 106', may occur in the direction N of the net 102 (See FIG. 2B). The release of the tear straps 106 may also transform the net 102 from the ready to capture position, as depicted in FIG. 3A, into the basket-like configuration, as depicted in FIG. 3B.

According to one embodiment, the top net poles 104' are loaded similarly to the bottom net poles 104", however the tear straps 106 are rated lower and are longer on the top than on the bottom. This ensures to improve the basket-like configuration of the net 102. The top tear straps 106 may tear all the way and, since they are longer, they compensate for the top poles being higher.

After recovery, the pole pairs 104 and net 102 are lowered using the hydraulic actuator 128 and the aircraft 300 may be manually removed from the net by a ground crew.

Figure 3C:
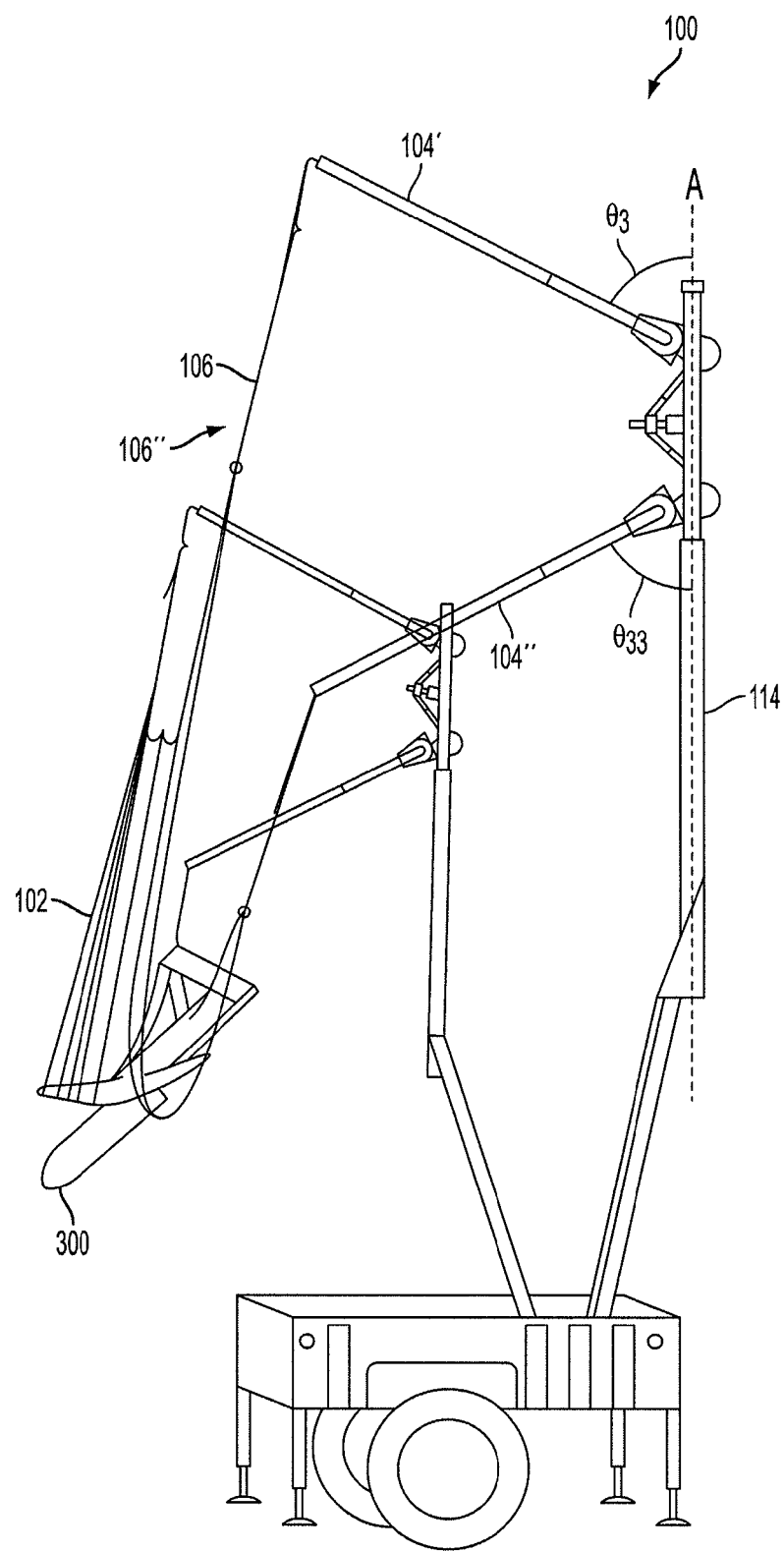
FIG. 3C depicts a side view of the mobile aircraft recovery system after impact of the aircraft, according to an embodiment of the present invention.

FIG. 3C depicts a side view of the mobile aircraft recovery system 100 after impact of the aircraft 300, according to an embodiment of the present invention. In this embodiment, the aircraft 300 has been captured and has come to rest in the net 102. The top and bottom net poles 104', 104" have similarly come to rest at angles $\theta_3$ and $\theta_{33}$, respectively, relative to the vertical beam 114.

FIG. 4 depicts a side view of the mobile aircraft recovery system 100 during impact of the aircraft 300, according to an alternative embodiment of the present invention. In addition to that described in FIG. 3B, in this alternative embodiment, as the aircraft 300 first strikes the net 102, this initial impact force causes each arm assembly 110 to pivot forward on the recovery pivot beam 112 (see FIG. 1). As seen in FIG. 4, the arm assembly 110 has pivoted away from the perpendicular axis A in the direction of impact D by an angle $\alpha$. This additional movement of the arm assemblies 100 helps further dissipate the momentum of the aircraft 300 during capture.

Figure 5:
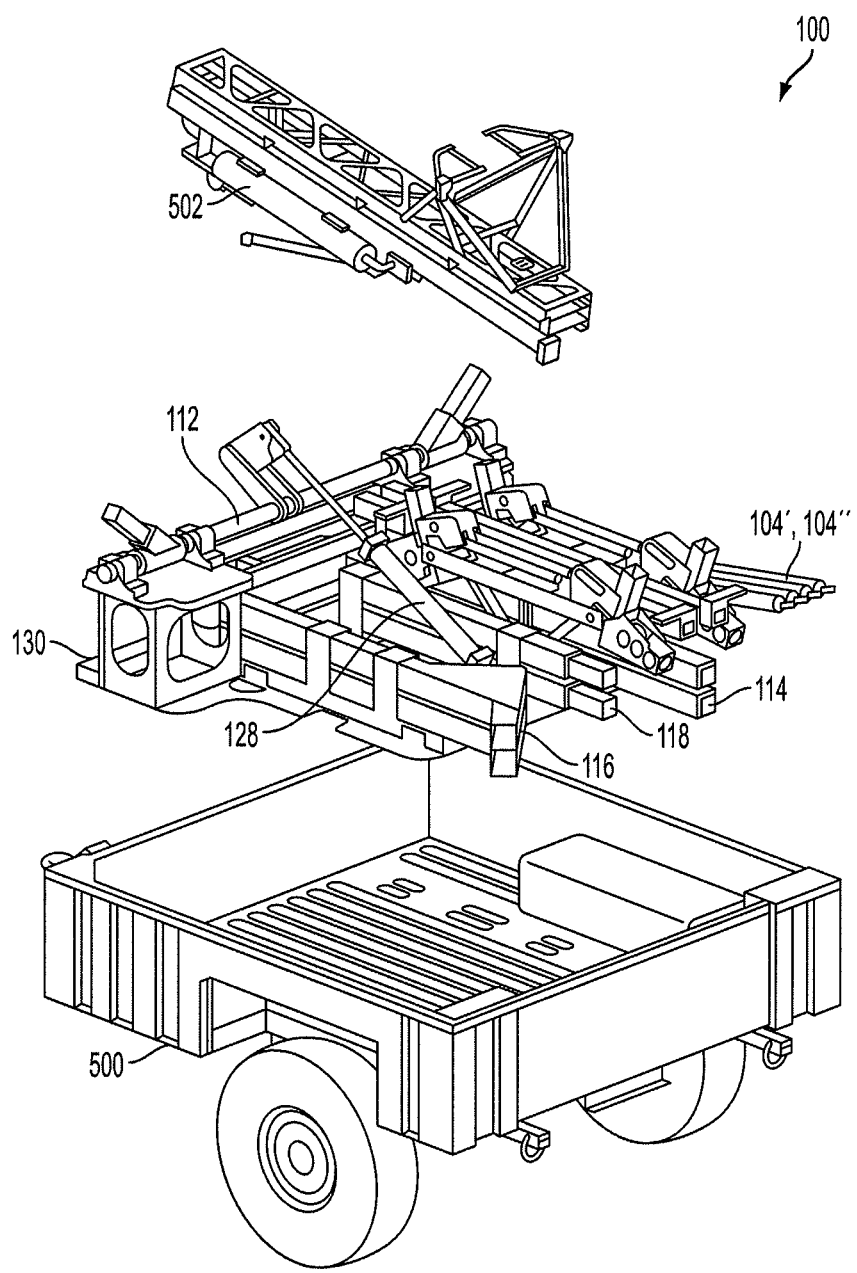
FIGS. 5 and 6 depict an exploded view of the mobile recovery unit in a stowed position, according to an embodiment of the present invention.
Figure 6:
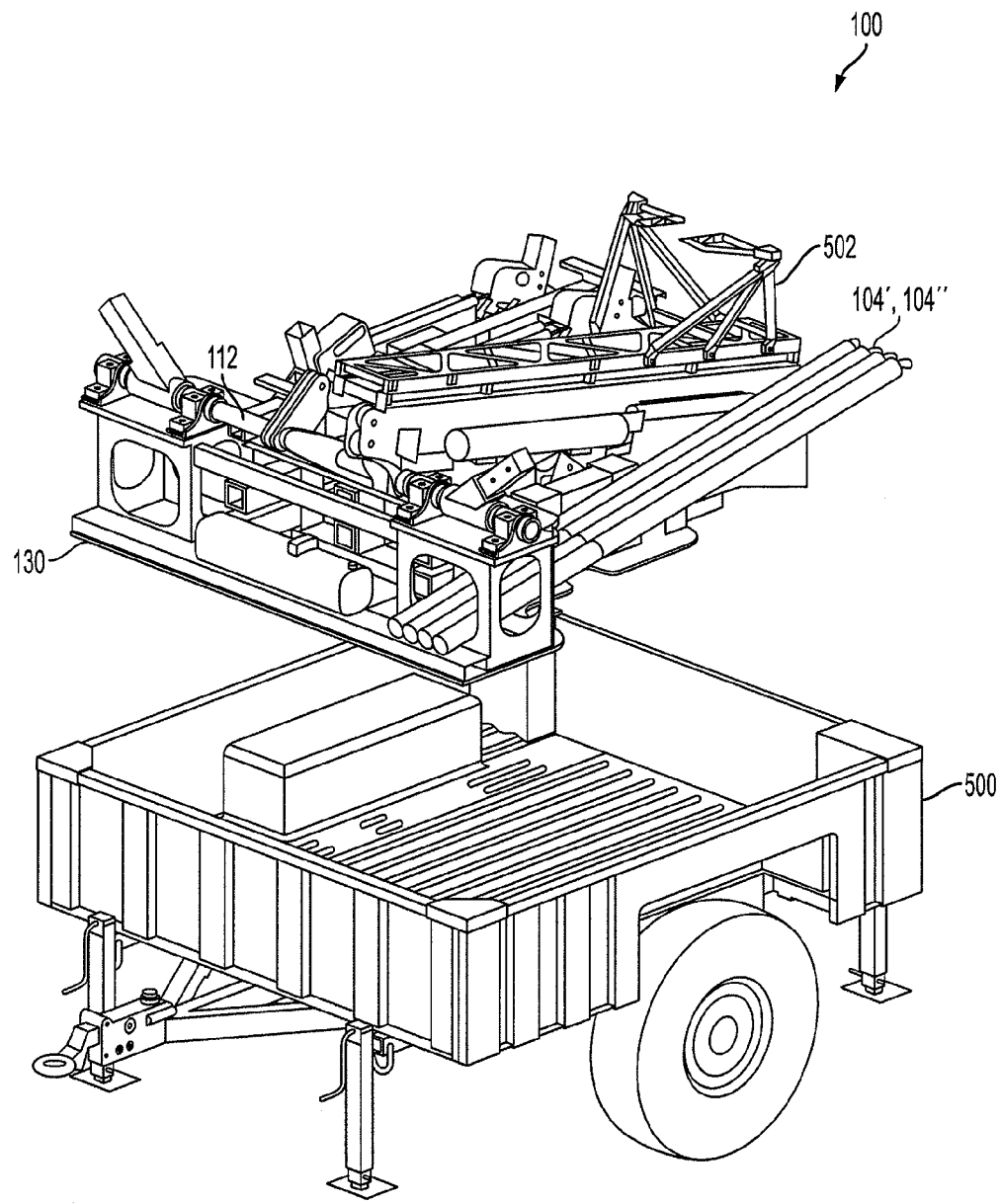

FIGS. 5 and 6 depict an exploded view of the mobile aircraft recovery unit 100 in a stowed position, according to an embodiment of the present invention. As shown, the mobile aircraft recovery unit 100 comprises a modular design to permit disassembly for compact storage when not in use. Specifically, the recovery base 130 may house the disassembled net poles 104', 104", the recovery pilot beam 112, the vertical beams 114, the corner beams 116, the diagonal beams 118 and the recovery actuator 128. The recovery base 130 may fit into a mobile unit 500, for example a trailer assembly. According to one embodiment, a launcher assembly 502 may be coupled to the recovery base 130 of the mobile unit 500 to launch the aircraft 300.

Additionally, the net 102, tear straps 106, hand control unit (see control unit 700 below), electrical cables and other equipment may be transported within the mobile unit 500 in transit cases (not shown).

Figure 7:
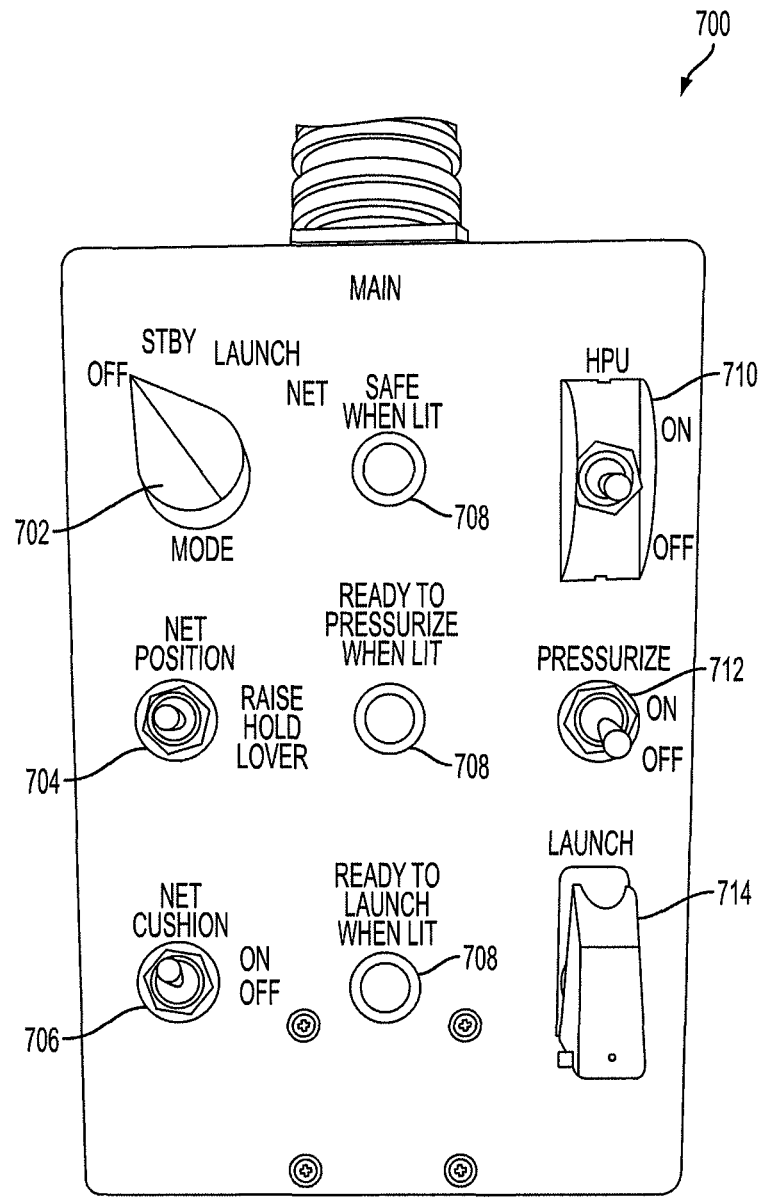
FIG. 7 depicts a front view of a control unit of the mobile aircraft recovery system, according to an embodiment of the present invention.

FIG. 7 depicts a front view of a control unit 700 of the mobile aircraft recovery system 100, according to an exemplary embodiment of the present invention. According to one embodiment, the control unit 700 may control both the mobile aircraft recovery system 100, as well as the launch system. The control unit 700 may include a mode switch 702 to switch between "off," "standby," "launch," and "net" modes. The control unit 700 may include a net position switch 704 for lifting or lowering the position of the net 102 using the hydraulic activation system 126. Further, the control unit 700 may include a net cushion switch 706 for adjusting the predetermined angle α of the arm assembly 110 relative to the perpendicular axis A to ensure that the net 102 remains in the ready to capture position prior to impact of the aircraft 300 on the net 102.

The control unit 700 may include one or more indicators 708 to indicate, for example, that the mobile aircraft recovery system 100 or launch assembly 502 is safe to operate, that the hydraulic activation system 126 of the mobile aircraft recovery system 100 is ready to pressurize, or that the launch assembly 502 is ready to launch the aircraft 300. The control unit 700 may further include, for example, a hydraulic power unit (HPU) switch 710 to activate the hydraulic activation system 126 for either recovery operation or launch, a pressurize switch 712 to pressurize the hydraulic activation system 126 and/or a launch switch 714 to launch the aircraft using the launch assembly 502.

Alternatively, the mobile aircraft recovery system 100 may be embodied as a passive capture system, where no electronics or computers are required. For example, switch logic may be used without the use of computers or software.

Embodiments of the mobile aircraft recovery system 100 enjoy several advantages over other systems known in the art. The mobile aircraft recovery system 100 can be mobilized on land or on a ship deck with a single trailer and does not require the use of separate supporting structures or anchors. One exception is the use of the mobile aircraft recovery system 100 on a ship deck during a high sea state, where tie-downs are required for all deck equipment. The small footprint of the mobile aircraft recovery system 100 allows for easy ship integration, including minimal modification and interference with current operations, also known as normal operations on the flight deck or "OPS." Because the mobile aircraft recovery system 100 may be added to an existing ship, it is important that the system does not interfere with existing operational procedure and business. The mobile aircraft recovery system 100 is further able to withstand ship motion having pitch, heave and roll tolerance, as well as navigation sensitivity.

The mobile aircraft recovery system 100 is quick and easy to both assemble and disassemble. The mobile aircraft recovery system 100 does not require a unique configuration of the aircraft 300 due to the basket-like configuration of the net 102 which supports a soft impact on the aircraft wings. For example, the aircraft 300 does not require the use of strengthening devices in the aircraft's wings to support the capture, as is known in the prior art. Similarly the soft landing enabled by the mobile aircraft recovery system 100 has a minimal impact on the aircraft 300 weight since flight loads are the driving consideration for structural sizing. Only minor wing leading edge enhancement may be required with minimal weigh impact on the aircraft.

The mobile aircraft recovery system 100 may be sized to work accurately with existing aircraft navigation systems and may be combined with a launcher assembly 502, as described above. The mobile aircraft recovery system 100 is both compact and transportable, as well as reliable and durable during use. The mobile aircraft recovery system 100 is cost efficient in both the development and production stages.

It will be understood that the above description of the present invention is susceptible to various modifications, changes and adaptations, and that the same are intended to be comprehended within the meaning and range of equivalents of the appended claims.

What is claimed is:

1. A method for the recovery of an aircraft, comprising:
attaching a first pole pair comprising first top and bottom poles respectively to first top and bottom positions of a capture device;
attaching a second pole pair comprising second top and bottom poles respectively to second top and bottom positions of the capture device;
moving each pole pair from a first position, in which the pole pairs hold the capture device in an open position to capture the aircraft, to a second position, in which the top and bottom poles of the first pole pair and the second pole pair pivot about a pivot point with respect to one another and hold the capture device in a closed position to contain the captured aircraft; and
absorbing the force of an impact using energy elements, each coupled on one end to a respective top or bottom position of the capture device and on another end to a respective top or bottom pole.

2. A method for the recovery of an aircraft, comprising:
attaching a first pole pair comprising first top and bottom poles respectively to first top and bottom positions of a capture device;
attaching a second pole pair comprising second top and bottom poles respectively to second top and bottom positions of the capture device;
pivoting the first and second pole pairs forward in the direction of an impact;
moving each pole pair from a first position, in which the pole pairs hold the capture device in an open position to capture the aircraft, to a second position, in which the top and bottom poles of the first pole pair and the second pole pair pivot about a pivot point with respect to one another and hold the capture device in a closed position to contain the captured aircraft; and
absorbing the force of the impact using energy elements, each coupled on one end to a respective top or bottom position of the capture device and on another end to a respective top or bottom pole.

3. The method of claim 1, further comprising synchronizing the moving of the top and bottom poles, respectively, using synchronization devices coupled to each one of the first and second pole pairs, wherein the synchronization devices provide the pivot point between the to and bottom poles of the first and second pole pairs.

4. The method of claim 1, further comprising cradling the aircraft after impact on the capture device comprising a ribbon net that forms a basket-like configuration, wherein the top and bottom poles of the first and second pole pairs pivot to the second position and fold the ribbon net around the aircraft.

5. The method of claim 1, further comprising maintaining the open position prior to the impact of the aircraft on the capture device, using a beam coupled to each one of the first and second pole pairs on ends opposite from the capture device, and shear devices positioned between the first and second bottom poles and each respective beam.

6. The method of claim 1, further comprising attenuating the speed of the aircraft after impact of the aircraft on the capture device using shock absorption devices each coupled to a respective one of the first and second pole pairs, wherein the shock absorption devices provide the pivot point between the top and bottom poles of the first and second pole pairs.

7. The method of claim 1, further comprising positioning the top and bottom poles of the first and second pole pairs at a predetermined angle to retain a net in a ready to capture position prior to impact.

8. The method of claim 2, further comprising synchronizing the movement of the top and bottom poles, respectively, using synchronization devices coupled to each one of the first and second pole pairs, wherein the synchronization devices provide the pivot point between the top and bottom poles of the first and second pole pairs.

9. The method of claim 2, further comprising cradling the aircraft after impact on the capture device comprising a ribbon net that forms a basket-like configuration.

10. The method of claim 2, further comprising maintaining the open position prior to the impact of the aircraft on the capture device, using a beam coupled to each one of the first and second pole pairs on ends opposite from the capture device, and shear devices positioned between the first and second bottom poles and each respective beam.

11. The method of claim 2, further comprising attenuating the speed of the aircraft after impact of the aircraft on the capture device using shock absorption devices each coupled to a respective one of the first and second pole pairs, wherein the shock absorption devices provide the pivot point between the top and bottom poles of the first and second pole pairs.

12. The method of claim 2, further comprising positioning the top and bottom poles of the first and second pole pairs at a predetermined angle to retain a net in a ready to capture position prior to impact.

13. The method of claim 4, further comprising focusing the impact of the capture device on a wing of the aircraft adjacent to a fuselage.

* * * * *